United States Patent
Park et al.

(10) Patent No.: US 12,033,805 B2
(45) Date of Patent: Jul. 9, 2024

(54) MULTILAYER ELECTRONIC COMPONENT

(71) Applicant: SAMSUNG ELECTRO-MECHANICS CO., LTD., Suwon-si (KR)

(72) Inventors: Seon Ho Park, Suwon-si (KR); Jae Seok Yi, Suwon-si (KR); Moon Soo Park, Suwon-si (KR); Chang Hak Choi, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 67 days.

(21) Appl. No.: 17/969,189

(22) Filed: Oct. 19, 2022

(65) Prior Publication Data

US 2023/0386749 A1 Nov. 30, 2023

(30) Foreign Application Priority Data

May 25, 2022 (KR) .......................... 10-2022-0064307

(51) Int. Cl.
*H01G 4/30* (2006.01)
*H01G 4/008* (2006.01)
*H01G 4/012* (2006.01)
*H01G 4/12* (2006.01)

(52) U.S. Cl.
CPC .............. *H01G 4/30* (2013.01); *H01G 4/008* (2013.01); *H01G 4/012* (2013.01); *H01G 4/1227* (2013.01)

(58) Field of Classification Search
CPC ...... H01G 4/008; H01G 4/012; H01G 4/1227; H01G 4/30
See application file for complete search history.

(56) References Cited

U.S. PATENT DOCUMENTS

| 2009/0009927 | A1* | 1/2009 | Iguchi | H01G 4/30 |
| | | | | 361/321.5 |
| 2012/0057272 | A1* | 3/2012 | Hirata | H01G 4/008 |
| | | | | 361/321.4 |
| 2015/0279570 | A1* | 10/2015 | Koga | H01G 4/248 |
| | | | | 29/25.42 |
| 2019/0341190 | A1* | 11/2019 | Lee | H01G 4/2325 |
| 2022/0285096 | A1* | 9/2022 | Iguchi | H01G 4/1227 |
| 2022/0285097 | A1* | 9/2022 | Iguchi | H01G 4/1209 |
| 2022/0285098 | A1* | 9/2022 | Iguchi | H01G 4/30 |

FOREIGN PATENT DOCUMENTS

| JP | 2001-143957 A | 5/2001 |
| JP | 2009-016547 A | 1/2009 |

* cited by examiner

*Primary Examiner* — Nathan Milakovich
(74) *Attorney, Agent, or Firm* — MORGAN, LEWIS & BOCKIUS LLP

(57) ABSTRACT

A multilayer electronic component includes a body including a plurality of dielectric layers and internal electrodes, external electrodes disposed on the body to be connected to the internal electrodes, and a metal oxide disposed between the body and the external electrodes. The metal oxide includes calcium (Ca), zinc (Zn), and silicon (Si), and further includes at least one selected from the group consisting of barium (Ba), boron (B), and aluminum (Al).

20 Claims, 8 Drawing Sheets

P2'

MULTILAYER ELECTRONIC COMPONENT

CROSS-REFERENCE TO RELATED APPLICATION(S)

This application claims benefit of priority to Korean Patent Application No. 10-2022-0064307 filed on May 25, 2022 in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a type of multilayer electronic component, is a chip-type condenser mounted on the printed circuit boards of various types of electronic products such as an image display device, for example, a liquid crystal display (LCD), a plasma display panel (PDP) or the like, a computer, a smartphone, and a mobile phone to serve to charge or discharge electricity therein or therefrom.

Such multilayer ceramic capacitors tend to be increasingly used not only in the IT industry but also in industry of large-sized electronic equipment such as automobiles, factories, and the like. As compared with an IT product use environment according to the related art, most use environments of the electronic equipment industry include high temperature, high vibration, and high humidity, so that it is important to manufacture a high-reliability multilayer ceramic capacitor.

When a body including a dielectric layer and an internal electrode is sintered at high temperature, pores may be formed in the dielectric layer. The pores may act as channels through which moisture may permeate into a multilayer electronic component. For example, when an exposed portion of the dielectric layer or the internal electrode is not airtightly covered with an external electrode, permeation of external moisture may be facilitated, and thus, moisture resistance reliability may be deteriorated.

SUMMARY

An aspect of the present disclosure is to provide a multilayer electronic component having improved moisture resistance reliability achieved by forming a metal oxide layer on a body to prevent the permeation of external moisture thereinto.

However, the present disclosure is not limited thereto, and may be more easily understood in a process of describing exemplary embodiments in the present disclosure.

According to an aspect of the present disclosure, a multilayer electronic component includes a body including a plurality of dielectric layers and an internal electrode, an external electrode disposed on the body to be connected to the internal electrode, and a metal oxide disposed between the body and the external electrode. The metal oxide includes calcium (Ca), zinc (Zn), silicon (Si), and at least one selected from the group consisting of barium (Ba), boron (B), and aluminum (Al).

According to another aspect of the present disclosure, a multilayer electronic component includes a body including a plurality of dielectric layers and an internal electrode, an external electrode disposed on the body to be connected to the internal electrode, and a metal oxide disposed between the body and the external electrode. The metal oxide is formed by coating metal oxide paste on the body and then thermally treating the coated metal oxide paste. The metal oxide paste may include calcium (Ca), zinc (Zn), and silicon (Si), and may further include at least one selected from the group consisting of barium (Ba), boron (B), and aluminum (Al).

According to an aspect of the present disclosure, a multilayer electronic component includes a body including a plurality of dielectric layers and an internal electrode, an external electrode disposed on the body to be connected to the internal electrode, and a metal oxide disposed between the body and the external electrode. The metal oxide includes zinc (Zn), silicon (Si), and at least one selected from the group consisting of barium (Ba), boron (B), and aluminum (Al).

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
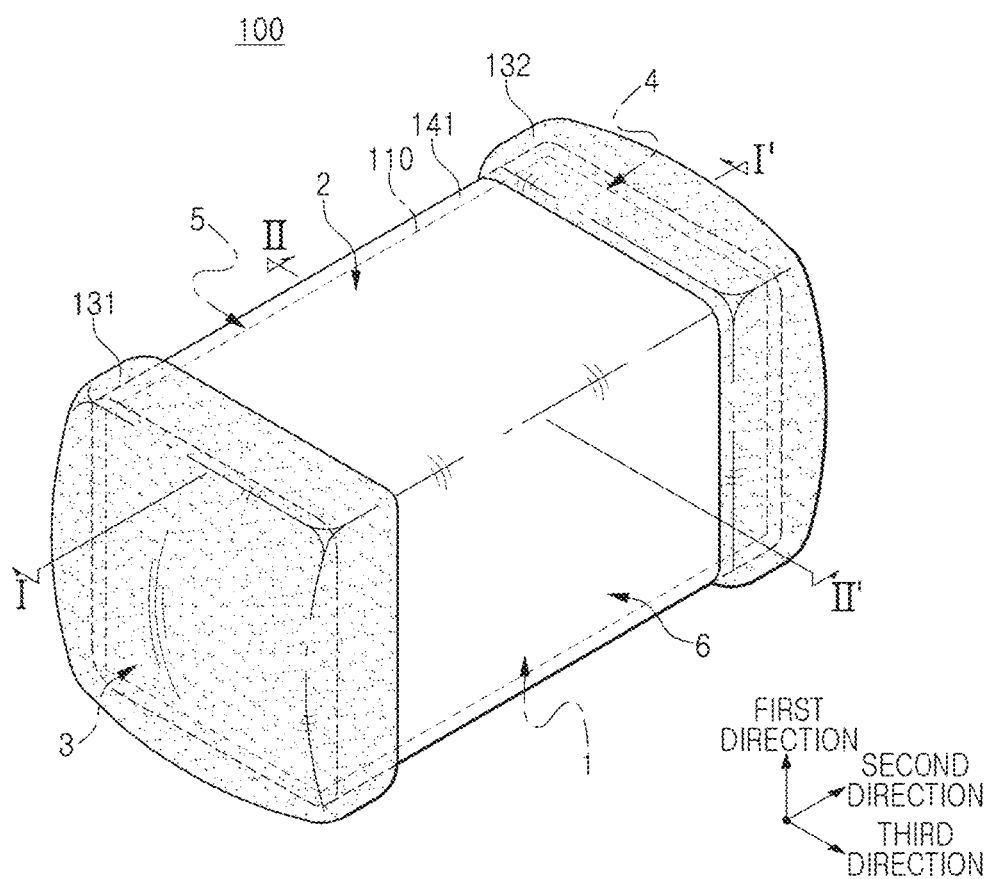
FIG. 1 is a schematic perspective view of a multilayer electronic component according to an exemplary embodiment in the present disclosure.

Hereinafter, embodiments of the present disclosure will be described with reference to specific embodiments and the accompanying drawings. However, embodiments of the present disclosure may be modified to have various other forms, and the scope of the present disclosure is not limited to the embodiments described below. Further, embodiments of the present disclosure may be provided for a more complete description of the present disclosure to the ordinary artisan. Therefore, shapes and sizes of the elements in the drawings may be exaggerated for clarity of description, and the elements denoted by the same reference numerals in the drawings may be the same elements.

In the drawings, portions not related to the description will be omitted for clarification of the present disclosure, and a thickness may be enlarged to clearly illustrate layers and regions. The same reference numerals will be used to designate the same components in the same reference numerals. Further, throughout the specification, when an element is referred to as "comprising" or "including" an element, it means that the element may further include other elements as well, without departing from the other elements, unless specifically stated otherwise.

In the drawings, a first direction may be defined as a stacking direction or a thickness (T) direction, a second direction may be defined as a length (L) direction, and a third direction may be defined as a width (W) direction.

Multilayer Electronic Component

FIG. 1 is a schematic perspective view of a multilayer electronic component according to an exemplary embodiment in the present disclosure.

Figure 2:
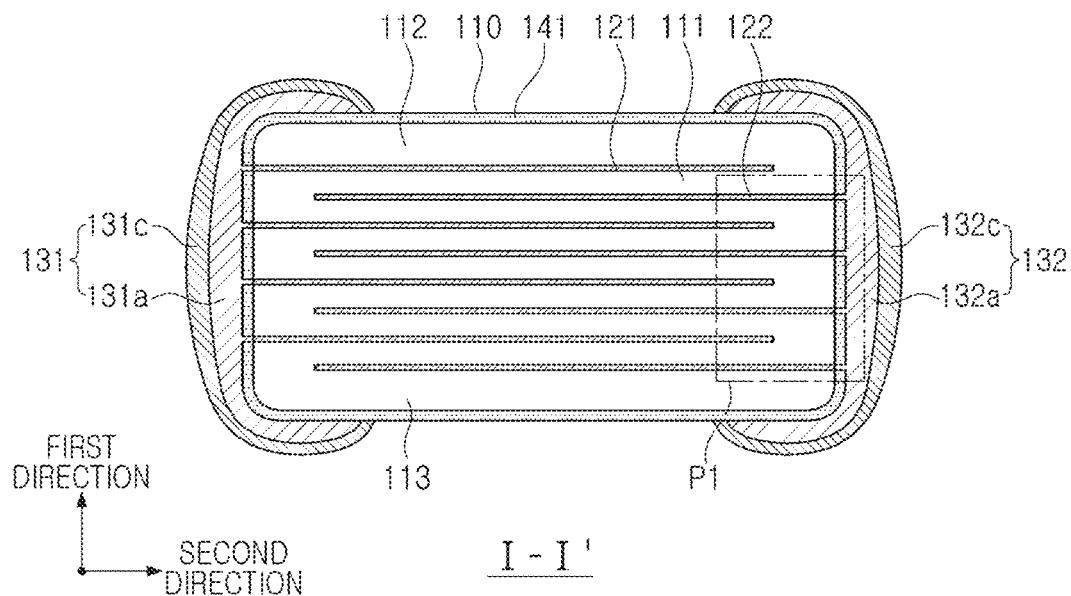
FIG. 2 is a cross-sectional view taken along line I-I' of FIG. 1.

FIG. 2 is a cross-sectional view taken along line I-I' of FIG. 1.

Figure 3:
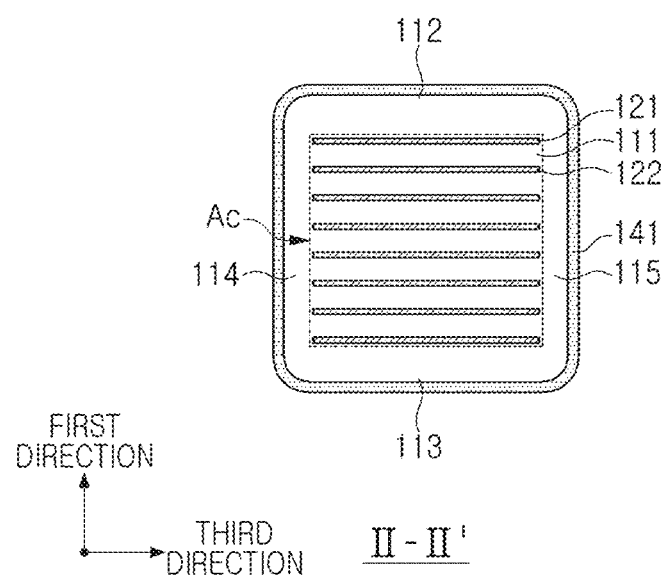
FIG. 3 is an enlarged view of region II-II' of FIG. 1.

FIG. 3 is an enlarged view of region II-II' of FIG. 1.

Figure 4A:
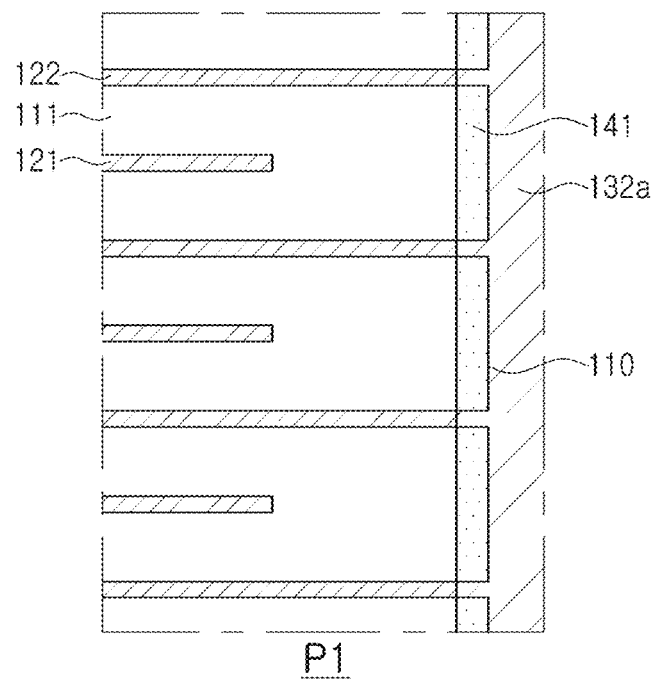
FIG. 4A is a schematic enlarged view of region P1 of FIG. 2.
Figure 4B:
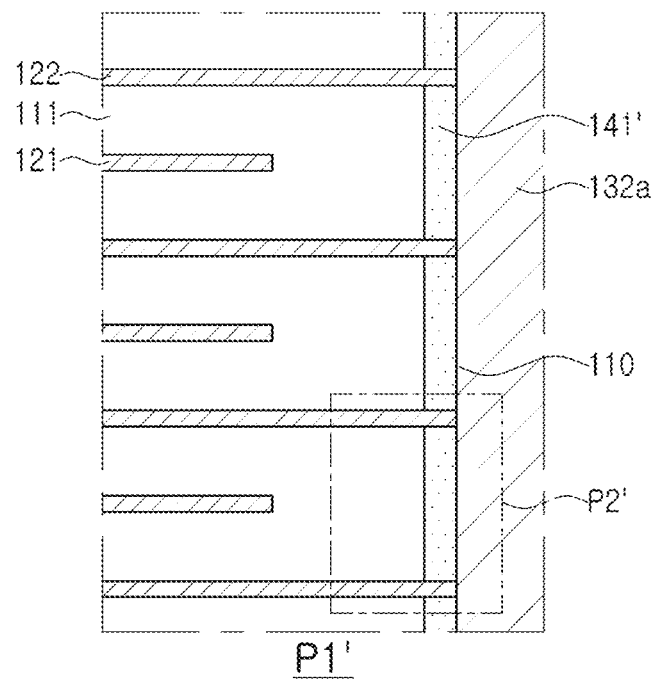
FIG. 4B is a schematic enlarged view of region P1' in which a metal oxide layer is formed to have another shape.

FIG. 4A is a schematic enlarged view of region P1 of FIG. 2, and FIG. 4B is a schematic enlarged view of region P1' in which a metal oxide layer is formed to have another shape.

Figure 5:
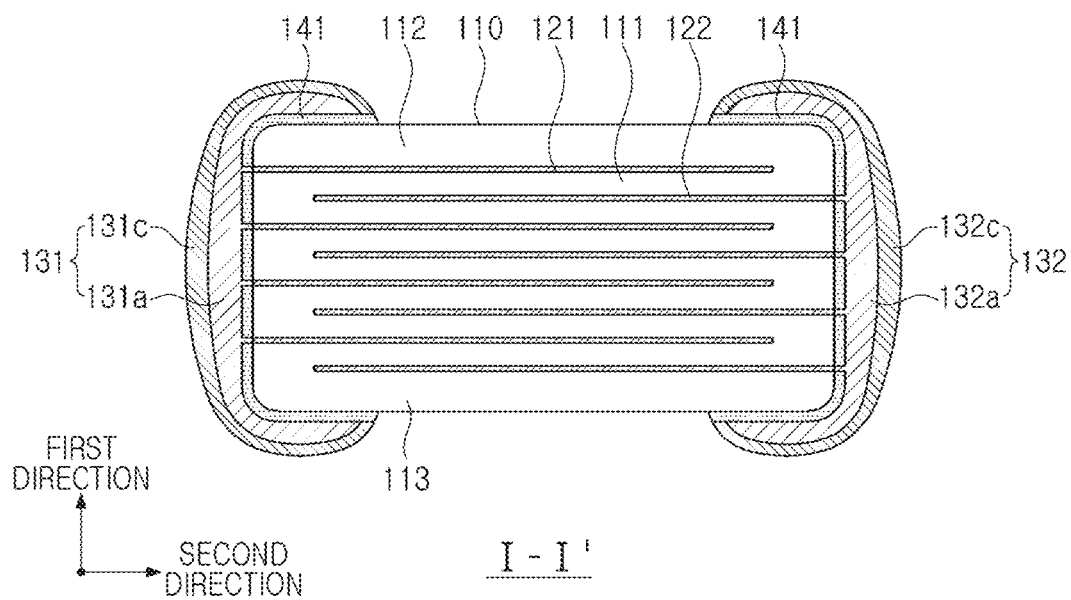
FIG. 5 is a cross-sectional view taken along line I-I' and illustrating a multilayer electronic component according to an exemplary embodiment in the present disclosure.

FIG. 5 is a cross-sectional view taken along line I-I' and illustrating a multilayer electronic component according to an exemplary embodiment in the present disclosure.

Figure 6:
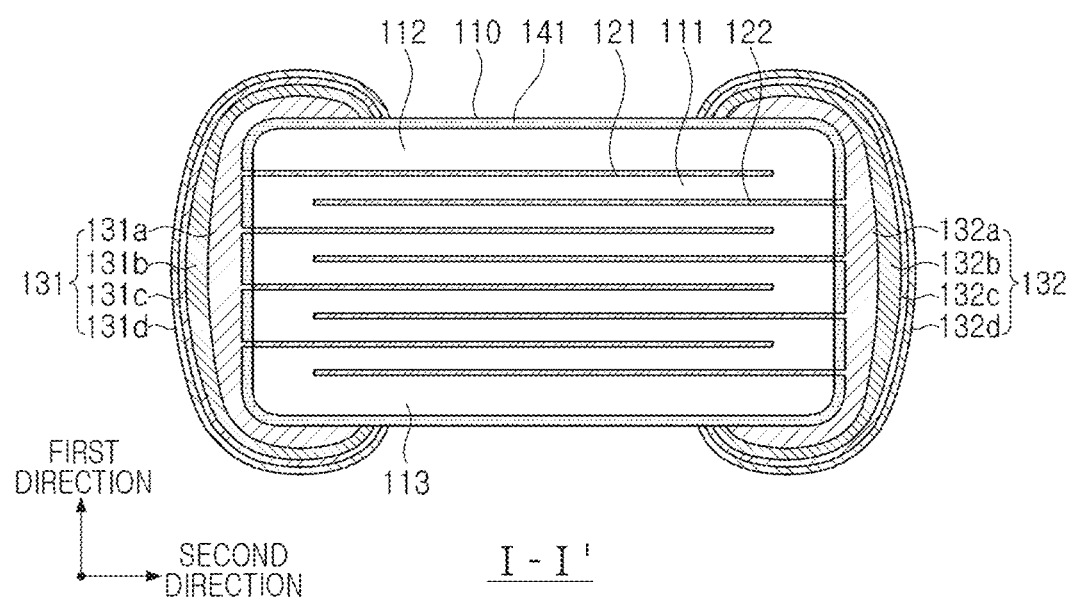
FIG. 6 is a cross-sectional view taken along line I-I' and illustrating a multilayer electronic component according to an exemplary embodiment in the present disclosure.

FIG. 6 is a cross-sectional view taken along line I-I' and illustrating a multilayer electronic component according to an exemplary embodiment in the present disclosure.

Hereinafter, a multilayer electronic component according to an exemplary embodiment will be described in detail with reference to FIGS. 1 to 6.

A multilayer electronic component 100 according to an exemplary embodiment may include a body 110 including a plurality of dielectric layers 111 and internal electrodes 121 and 122, external electrodes 131 and 132 disposed on the body 110 to be connected to the internal electrodes 121 and 122, and metal oxides 141 and 141' disposed between the body 110 and the external electrodes 131 and 132. The metal oxides 141 and 141' may include calcium (Ca), zinc (Zn), and silicon (Si), and may further include at least one selected from the group consisting of barium (Ba), boron (B), and aluminum (Al).

The body 110 may include a plurality of dielectric layers 111 and internal electrodes 121 and 122 disposed to face each other with respective dielectric layers 111 interposed therebetween.

A shape of the body 110 is not particularly limited, and may be a hexahedral shape or a shape similar to the hexahedral shape, as illustrated in the drawings. While the body 110 may not have a hexahedral shape having perfectly straight lines due to shrinkage of ceramic powder particles included in the body 110 in a sintering process, the body 110 may have a substantially hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1, 2, 3, and 4 and opposing each other in the third direction.

The plurality of dielectric layers 111 constituting the body 110 may be in a sintered state, and adjacent dielectric layers 111 may be integrated with each other such that boundaries therebetween are not readily apparent without using a scanning electron microscope (SEM).

A material of the dielectric layer 111 may not be limited to any particular material as long as sufficient capacitance is able to be obtained therewith. In general, a perovskite ($ABO_3$)-based material may be used. For example, a barium titanate-based material, a lead composite perovskite-based material, or a strontium titanate-based material may be used. The barium titanate-based material may include $BaTiO_3$-based ceramic powder particles, and an example of the ceramic powder particles include $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ in which calcium (Ca), zirconium (Zr), and the like, are partially solid-solute in $BaTiO_3$. A more detailed example of the ceramic powder particles may include $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1), $Ba(Ti_{1-y}Zr_y)O_3$ (0<y<1), or the like.

As the material of the dielectric layer 111, various ceramic additives, organic solvents, plasticizers, coupling agents, dispersants, and the like, may be added to powder particles such as barium titanate ($BaTiO_3$) powder particles, or the like, depending on an intended purpose.

A thickness td of the dielectric layer 111 does not need to be limited. However, to more easily achieve miniaturization and high capacitance of the multilayer electronic component 100, the thickness of the dielectric layer 111 may be 0.6 μm or less, in detail, 0.4 μm or less. The thickness td of the dielectric layer 111 may refer to a size of the dielectric layer 111 in the first direction, and may refer to an average thickness td of the dielectric layer 111 or an average size of the dielectric layer 111 in the first direction.

An average thickness td of the dielectric layer 111 may be measured by scanning the cross-sections in the first and second directions (length and thickness directions) of the body 110 with a scanning electron microscope (SEM) with a magnification of 10,000. For example, an average value thereof may be determined by measuring a thickness of a single dielectric layer at thirty (30) equally spaced points in the length direction in the scanned image. The thirty (30) equally spaced points may be designated in an active portion Ac. In addition, when such an average value is determined using measurements of average values to ten (10) dielectric layers, the average thickness td of the dielectric layer 111 may be more generalized.

The body 110 may include an active portion Ac disposed in the body 110 and including a first internal electrode 121 and a second internal electrode 122 disposed to oppose each other with the dielectric layer 111 interposed therebetween to form capacitance. For example, the body 110 may be formed by alternately laminating the dielectric layer 111, on which the first internal electrode 121 is printed, and the dielectric layer 111, on which the second internal electrode 122 is printed, in the first direction, and then sintering the laminated dielectric layers 111.

The first internal electrode 121 may be spaced apart from the fourth surface 4 and exposed through the third surface 3, and the second internal electrode 122 may be spaced apart from the third surface 3 and exposed through the fourth surface 4. The first and second internal electrodes 121 and 122 may be exposed through the fifth and sixth surfaces 5 and 6, respectively. In this case, the first and second internal electrodes 121 and 122 may be electrically separated from each other by the dielectric layer 111 disposed therebetween.

According to the above configuration, when a predetermined voltage is applied to the first and second external electrodes 131 and 132, electrical charges may be accumulated between the first and second internal electrodes 121 and 122. In this case, the capacitance of the multilayer electronic component 100 may be in proportion to an overlapping area of the first and second internal electrodes 121 and 122 overlapping each other in the first direction in the active portion Ac.

A material of the internal electrodes 121 and 122 is not limited and may include at least one of, for example, nickel (Ni), copper (Cu), palladium (Pd), silver (Ag), gold (Au), platinum (Pt), tin (Sn), tungsten (W), titanium (Ti), and alloys thereof, and the internal electrodes 121 and 122 may be formed using a conductive paste.

A thickness te of each of the internal electrodes 121 and 122 does not need to be limited. To more easily achieve miniaturization and high capacitance of the multilayer electronic component 100, the thickness te of each of the internal electrodes 121 and 122 may be 0.6 μm or less, in detail, 0.4 μm or less. The thickness te of each of the internal electrodes 121 and 122 may refer to a size of each of the internal electrodes 121 and 122 in the first direction, and may refer to an average thickness te of each of the internal electrodes 121 and 122 or an average size of each of the internal electrodes 121 and 122 in the first direction.

The average thickness te of each of the internal electrodes 121 and 122 may be measured by scanning the cross-sections in the first and second directions (length and thickness directions) of the body 110 with a scanning electron microscope (SEM) at a magnification of 10,000. For example, an average value thereof may be determined by measuring a thickness of one (1) internal electrode at thirty (30) equally spaced points in the second direction (the length direction) in the scanned image. The thirty (30) equally spaced points may be designated in the active portion Ac. In addition, when such an average value is determined using measurements of average values to ten (10) internal electrodes 121 and 122, the average thickness te of each of the internal electrode 121 and 122 may be more generalized.

The body 110 may include cover portions 112 and 113, respectively disposed above and below the active portion Ac in the first direction. An upper cover portion 112 and a lower cover portion 113 may be formed by laminating a single dielectric layer 111 or two or more dielectric layers 111 on upper and lower surfaces of the active portion Ac in the first direction, respectively, and may basically serve to prevent damage to the internal electrode 121 and 122 caused by physical or chemical stress.

The upper cover portion 112 and the lower cover portion 113 may not include an internal electrode and may include the same material as the dielectric layer 111. For example, the upper cover portion 112 and the lower cover portion 113 may include a ceramic material, for example, a barium titanate ($BaTiO_3$)-based ceramic material.

A thickness tc of each of the cover portions 112 and 113 does not need to be limited. To more easily achieve miniaturization and high capacitance of the multilayer electronic component, the thickness of each of the cover portions 112 and 113 may be 100 μm or less, in detail, 30 μm or less, and, in more detail, 20 μm or less. The thickness tc of each of the cover portions 112 and 113 may refer to a size thereof in the first direction, and may refer to an average thickness tc of the cover portions 112 and 113 or an average size of the cover portions 112 and 113 in the first direction.

The average thickness tc of each of the cover portions 112 and 113 may be measured by scanning the cross-sections in the first and third directions (width and thickness directions) of the body 110 with a scanning electron microscope (SEM) with a magnification of 10,000. For example, an average value may be determined by measuring a size thereof in the first direction at thirty (30) equally spaced points in the third direction in the scanned image. In addition, when the average value is measured by extending the measurement of the average value to the upper and lower cover portions 112 and 113, an average thickness tc of the cover portions 112 and 113 may be more generalized. The average thickness tc of the cover portions 112 and 113 may refer to an average size of the cover portions 112 and 113 in the first direction.

Margin portions 114 and 115 may be disposed on opposite end surfaces of the active portion Ac in the third direction. The margin portions 114 and 115 may include a first margin portion 114, disposed on the fifth surface 5 of the body 110, and a second margin portion 115 disposed on the sixth surface 6 of the body 110. For example, the margin portions 114 and 115 may be disposed on opposite end surfaces of the body 110 in the third direction. The margin portions 114 and 115 may refer to regions between opposite end surfaces of the first and second internal electrodes 121 and 122, and an external surface of the body 110, in a cross-section of the body 110 cut in the first and third directions (the width and thickness directions) and a boundary surface of the body 110.

The margin portions 114 and 115 may basically play a role in preventing damage to the internal electrodes caused by physical or chemical stress.

To suppress the step difference caused by the internal electrodes 121 and 122, the internal electrodes 121 and 122 may be cut to be exposed to the fifth and sixth surfaces 5 and 6 of the body 110 after lamination. Then, the margin portions 114 and 115 may be formed by laminating a single dielectric layer 111 or two or more dielectric layers 111 on opposite side surfaces of the active portion Ac in the third direction.

The margin portions 114 and 115 may not include the internal electrodes 121 and 122, but may include the same material as the dielectric layer 111, for example, a barium titanate ($BaTiO_3$)-based ceramic material.

An average width of the margin portions 114 and 115 does not need to be limited. To more easily achieve miniaturization and high capacitance of the multilayer electronic component, the average width of the margin portions 114 and 115 may be 80 μm or less, in detail 30 μm or less, and, in more detail, 20 μm or less. The average width of the margin portions 114 and 115 may refer to an average size thereof in the third direction.

The average width of the margin portions 114 and 115 may be measured by scanning the cross-sections in the first and third directions (width and thickness directions) of the body 110 with a scanning electron microscope (SEM) with a magnification of 10,000. For example, an average value may be determined by measuring a size thereof in the first direction at thirty (30) equally spaced points in the third direction in the scanned image. In addition, when the average value is measured by extending the measurement of the average value to the first and second margin portions 114 and 115, the average width of the margin portions 114 and 115 may be more generalized. The average width of the margin portions 114 and 115 may refer to an average size of the margin portions 114 and 115 in the third direction.

In general, when a body including a plurality of dielectric layers and internal electrodes is subjected to a sintering heat treatment at a high temperature, pores may be formed in the dielectric layers and may act as a channel through which external moisture and humidity permeate into the body. When a surface of the body exposed to the dielectric layer and the internal electrode is not hermetically sealed by the external electrode, the external moisture and humidity may permeate into vulnerable portions of the dielectric layer and the internal electrode, resulting in poor moisture resistance.

Currently, the most commonly used external electrode paste is a sintered copper (Cu) electrode, and pores are unavoidably formed in the sintered copper (Cu) electrode. When the pores formed during a sintering process extend from the inside to the outside of the body to be an open channel, external moisture and humidity may permeate to the active portion Ac, forming capacitance of a capacitor, and may finally result in failure.

To address a moisture resistance reliability issue caused by the above-described manufacturing method, in the multilayer electronic component according to an exemplary embodiment, before external electrode paste is coated on the body, a metal oxide paste may be coated on the body to form a metal oxide on the body to improve the moisture resistance reliability of the multilayer electronic component. The metal oxide may be disposed on the body to form a dense external film which may fill or block the open channel. Even when external electrode paste is applied onto the metal oxide, airtightness may be improved to suppress permeation of external moisture, humidity, or the like, into the body.

As a more detailed example, in the multilayer electronic component 100 according to an exemplary, metal oxides 141 and 141' may be disposed between the body 110 and the external electrodes 131 and 132. The metal oxides 141 and 141', as dense external layers filling cracks or pores formed in the dielectric layer 111 or the external electrodes 131 and 132 or filing an open channel formed from the outside of the body 110, may have an effect of suppressing permeation of external moisture, humidity, or the like, into the body 110. The metal oxides 141 and 141' may be disposed on the body 110 to improve moisture resistance reliability of the multilayer electronic component 100.

The metal oxides 141 and 141' may be disposed on the body 110 by sintering the plurality of dielectric layers 111 and the internal electrodes 121 and 122 and then coating metal oxide paste. As a method of coating the metal oxide paste, a method of immersing or dipping the body 110 in a metal oxide paste may be used, but exemplary embodiments are not limited thereto, and any method of coating metal oxide paste may be used.

The metal oxide paste may contain 1.5 to 2.5 wt % of metal oxide powder particles, in detail, 2.0 wt % of metal oxide powder particles, based on a total weight of the metal oxide paste.

The metal oxide paste may include calcium (Ca), zinc (Zn), and silicon (Si), and may further include at least one selected from the group consisting of barium (Ba), boron (B), and aluminum (Al).

In this case, the metal elements may be added as powder particles in the form of metal oxide, and the metal oxide powder particles may be added in an amount of 1.5 to 2.5 wt % with respect to a metal oxide paste composition.

As a more detail example, zinc (Zn) may be added in the form of oxide ($ZnO_2$). Zinc oxide ($ZnO_2$) has a low melting point, serving to decrease a melting point of the entire metal oxide paste. As the melting point is decreased, the internal electrode may be prevented from deteriorating and the metal oxide may be maintained in a paste state even at a low temperature. Thus, a process temperature may be easily controlled, and reduced economic costs and improved airtightness may be achieved due to fluidity at a low temperature.

Calcium (Ca) may be added in the form of oxide (CaO), which is aimed at preventing the metal oxide paste from being easily dissolved in water when only zinc oxide ($ZnO_2$) is added. As a more detailed example, when the temperature is decreased to room temperature again after the metal oxide paste is coated on the body in a molten state, glass containing silicon (Si) may be formed. In this case, calcium oxide (CaO) may prevent the glass from being dissolved in water to serve to easily form the glass on the body. The glass may serve to improve adhesion between the body and the external electrode, as will be described later.

An average content of the zinc (Zn) included in the metal oxide paste may be 3.5 moles or more to 4.5 moles or less with respect to 1 mole of the silicon (Si), and an average content of the calcium (Ca) may be 1.5 moles or more to 2.0 moles or less with respect to 1 mole of the silicon (Si).

As a more detailed example, the average number of moles of $ZnO_2$ added to the metal oxide paste may be 3.5 to 4.5 moles with respect to 1 mole of $SiO_2$, and the average number of moles of CaO added to the metal oxide paste may be 1.5 to 2.0 moles with respect to 1 mole of $SiO_2$.

Since the average number of moles of the added $ZnO_2$, CaO, and $SiO_2$ oxides are the same as the average number of moles of the Zn, Ca, and Si metal elements, descriptions will be provided based on the number of moles of the metal elements.

When the average content of zinc (Zn) is less than 3.5 mole with respect to 1 mole of silicon (Si), it may be difficult to sufficiently decrease a melting point of the metal oxide to a temperature at which a process is easily performed. When the average content of zinc (Zn) is greater than 4.5 moles with respect to 1 mole of silicon (Si), the metal oxide paste may be excessively dissolved in water, so that the glass may not be easily formed.

As a more detailed example, zinc (Zn) may serve as a network modifier depending on the composition of the metal oxide. When the average content of zinc (Zn) is greater than 4.5 moles with respect to 1 mole of silicon (Si), a secondary phase of $SiO_2$ may be excessively generated in a region in which the internal electrodes 121 and 122 and external electrodes 131 and 132 are in contact with each other, boundaries between the body 110 and the metal oxides 141 and 141', so that it may be difficult to form a uniform glass composition. Therefore, reliability may be deteriorated. The network former may correspond to a material allowing the structure of $SiO_2$ to be continuously formed, and the network modifier may correspond to a material allowing the structure of $SiO_2$ to be discontinuously formed. When the structure of $SiO_2$ is continuously formed to form glass, a network may be strongly formed to be modified into hard glass having high heat resistance. When the heat resistance is high, the glass may melt at high temperature, bonding properties may become poor during a low-temperature sintering process. However, by adding Zn oxide having a low melting point, the glass may fill pores of the dielectric layer 111 while melting at a temperature, lower than conventional sintering temperature of copper (Cu).

On the other hand, when the average content of calcium (Ca) is less than 1.5 moles with respect to 1 mole of silicon (Si), the glass may be dissolved in water to insufficiently form glass. When the average content of calcium (Ca) is greater than 2.0 moles with respect to 1 mole of silicon (Si), materials included in the metal oxide paste may not be uniformly mixed.

In the multilayer electronic component 100 according to an exemplary embodiment, the metal oxide paste may be thermally treated to form metal oxides 141 and 141' on the body 110. An average content of each of calcium (Ca), zinc (Zn), and silicon (Si) included in the metal oxides 141 and 141' disposed between the body 110 and the external electrodes 131 and 132 may be 0 wt % or more to 13 wt % or less, based on a total weight of barium (Ba), silicon (Si), aluminum (Al), calcium (Ca), zinc (Zn), strontium (Sr), sodium (Na), oxygen (O), and titanium (Ti) in the metal oxides 141 and 141'.

A more detailed description will be provided with reference to FIGS. 7 to 10.

Figure 7:
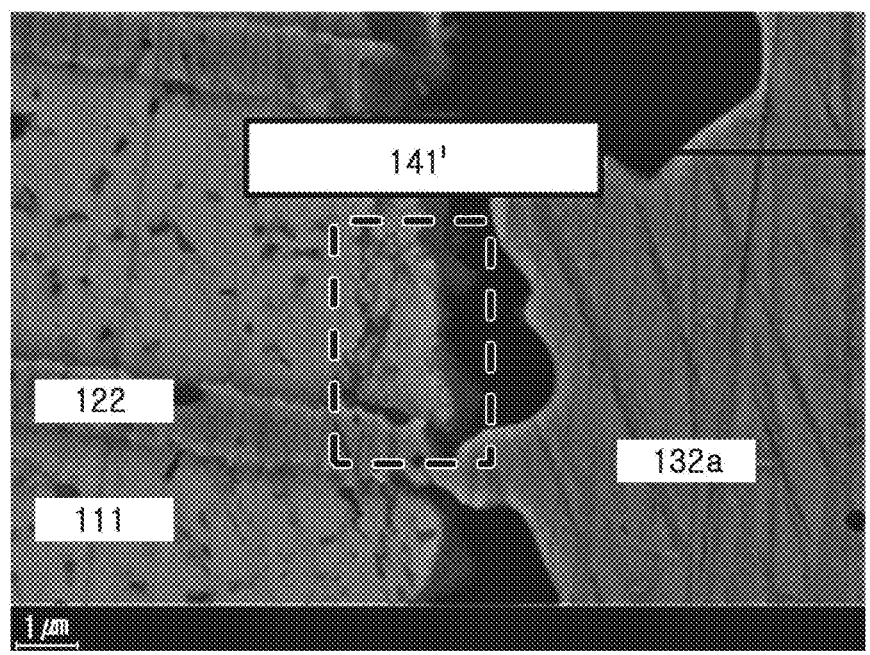
FIG. 7 is a SEM image of region corresponding to region P2' of FIG. 4B.

FIG. 7 is an SEM image in which a metal oxide 141' is formed by filling pores of the dielectric layer 111 exposed on the surface of the body 110, for example, between the body 110 and the external electrodes 131 and 132. The pores of the dielectric layer 111 may be filled to prevent an external open channel from being formed from the outside to the inside of the body 110 and to improve moisture resistance reliability.

Figure 8A:
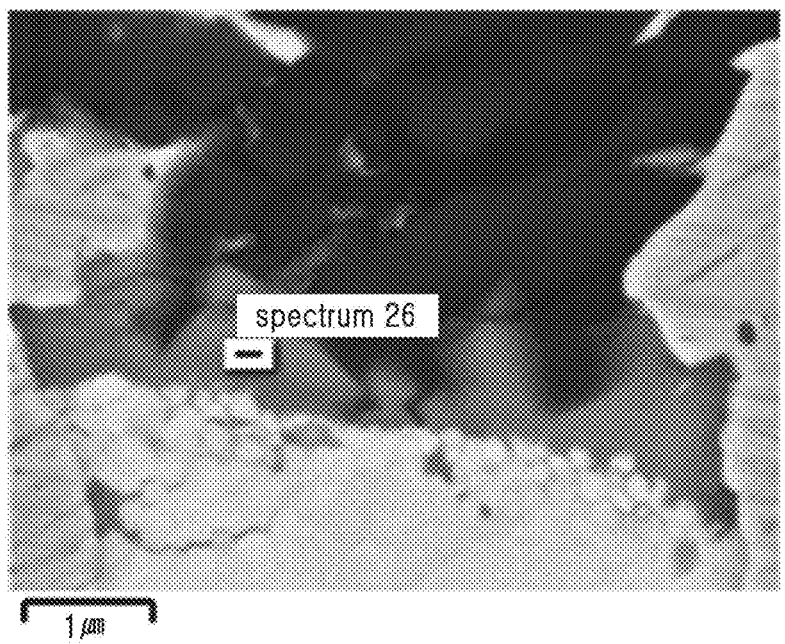
FIGS. 8A and 8B are images of a comparative example captured for SEM-EDS analysis of a metal oxide layer between a body and an external electrode and in a body region in which an external electrode is not disposed, respectively.
Figure 8B:
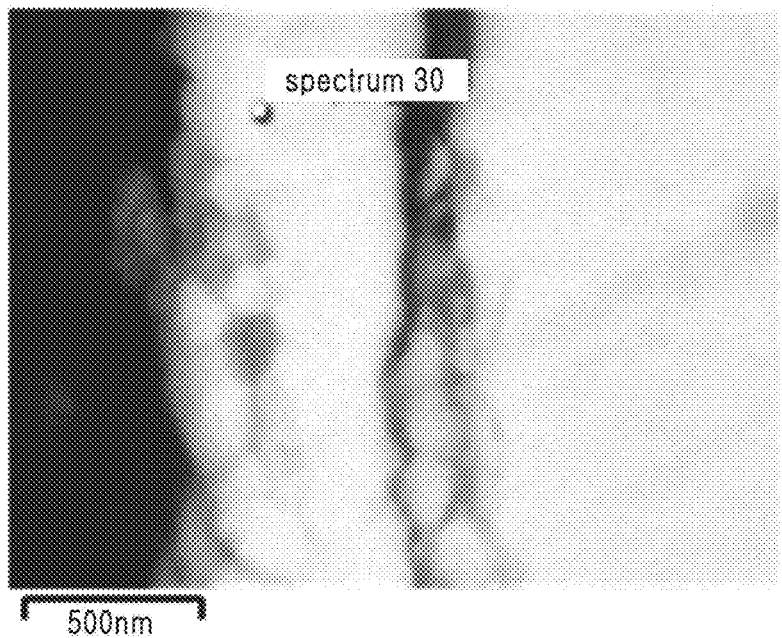
Figure 10A:
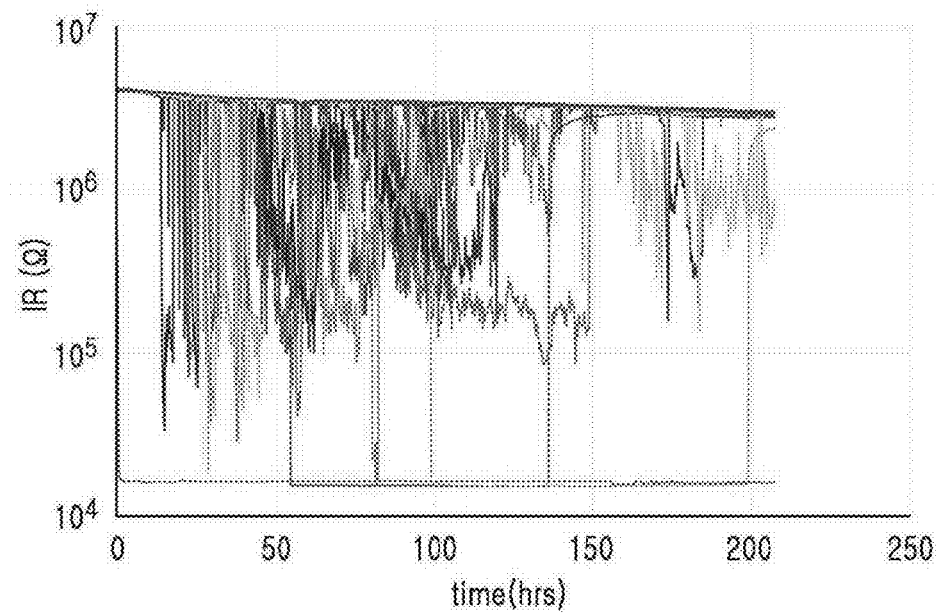
FIG. 10A is a HAST evaluation graph of Comparative Example.

FIG. 8A is an SEM image of a comparative example in which metal oxides 141 and 141' are not formed between the body 110 and the external electrodes 131 and 132, and FIG. 8B is an SEM image obtained by capturing the body 110 on which the external electrodes 131 and 132 of the same comparative example as in FIG. 8A are not disposed, and FIG. 10A is a highly accelerated temperature and humidity stress test (HAST) graph of the same comparative example in which a metal oxide is not formed.

Figure 9A:
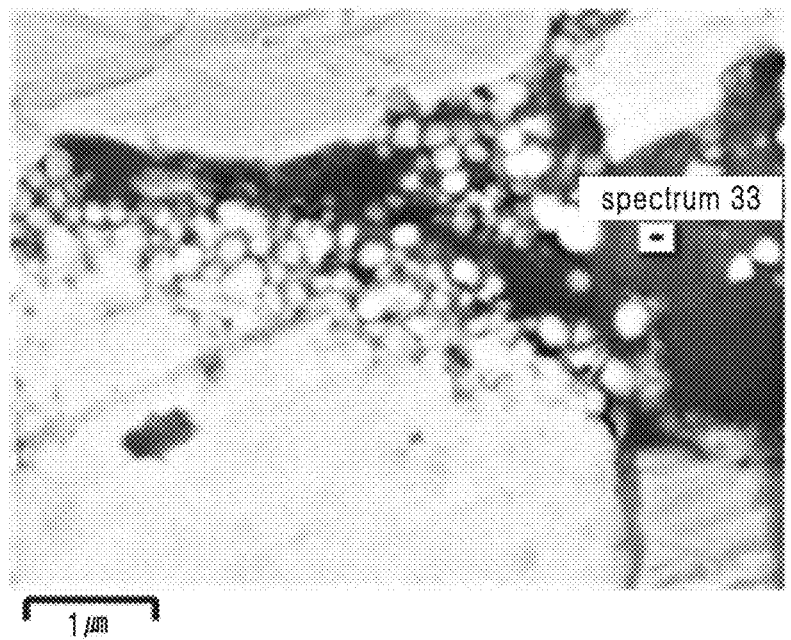
FIGS. 9A and 9B are images of an example captured for SEM-EDS analysis of a metal oxide layer between a body and an external electrode and in a body region in which an external electrode is not disposed, respectively.
Figure 9B:
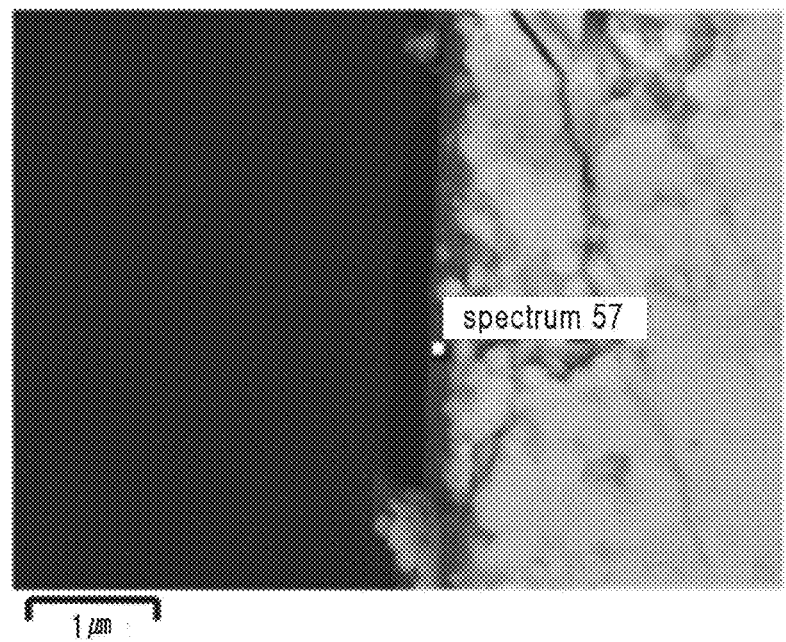
Figure 10B:
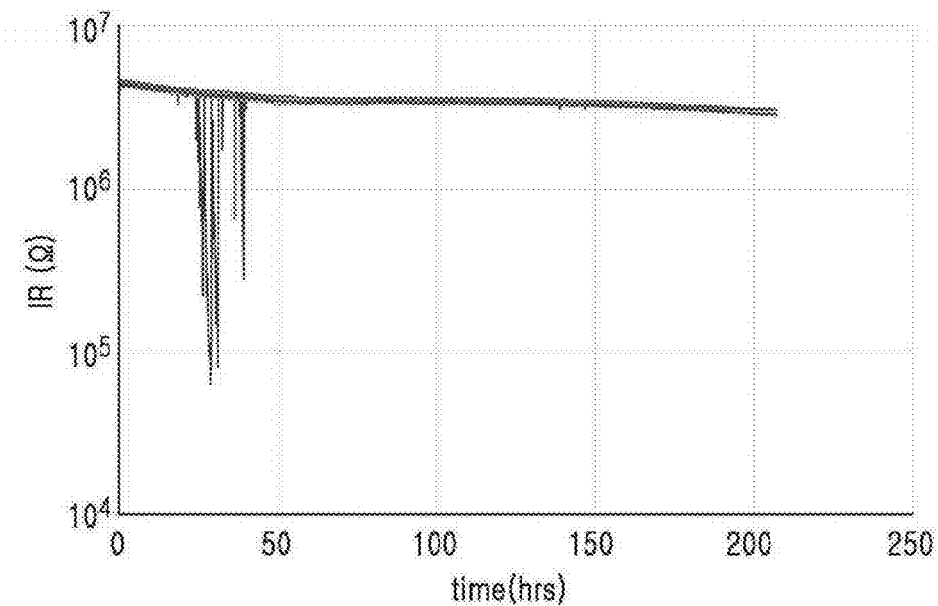
FIG. 10B is a HAST evaluation graph of Example.

FIG. 9A is an SEM image of an embodiment in which metal oxides 141 and 141' are formed between the body 110 and the external electrodes 131 and 132, and FIG. 9B is an SEM image obtained by capturing a metal oxide 141 on a body 110 in which the external electrodes 131 and 132 of the same embodiment as in FIG. 9A are not disposed, and FIG. 10B is a HAST graph of the same embodiment in which a metal oxide is formed.

Results of detecting contents of elements at spectrum points of FIGS. 8 and 9 are listed in Table 1 to be described later. From FIGS. 8 and 9, it can be seen that a metal oxide was formed. From FIG. 10, it can be seen that moisture resistance reliability is improved when a metal oxide is formed on a body.

The contents of the elements may be measured to be different depending on EDS analysis positions of the elements. However, as the EDS analysis of regions, in which a metal oxide is formed, is performed several times, an average content of each of calcium (Ca), zinc (Zn) and silicon (Si) may be converged to more than 0 wt % to 13 wt % or less. The average content may be measured to be higher than a content of each element, included in a metal oxide paste, due to metal elements included in the external electrodes 131 and 132 disposed on the metal oxide, but an average content of the elements included in the metal oxide may be calculated through the above-described measuring method. For example, the average contents of each of calcium (Ca), zinc (Zn), and silicon (Si) may be measured by performing EDS analysis on five or ten points in the cross-sections in the first and second directions (length and thickness directions) of the body 110, in which the metal oxide is disposed, with a scanning electron microscope (SEM) with a magnification of 10,000. Other methods and/or tools appreciated by one of ordinary skill in the art, even if not described in the present disclosure, may also be used.

The metal oxides 141 and 141' may extend from the external electrodes 131 and 132 as well as between the body 110 and the external electrodes 131 and 132 to be disposed even in a region of the body in which the external electrodes 131 and 132 are not disposed.

In this case, the average content of each of the metal oxides 141 and 141', disposed in the region of the body 110 in which the external electrodes 131 and 132 are not disposed, may be greater than 0 wt % to 6 wt % or less, based on a total weight of barium (Ba), silicon (Si), aluminum (Al), calcium (Ca), zinc (Zn), strontium (Sr), sodium (Na), oxygen (O), and titanium (Ti) in the metal oxides 141 and 141'.

Since the external electrodes 131 and 132 are not disposed on the metal oxide, the average content may be detected to be lower than a content of elements included in a metal oxide disposed between the body 110 and the external electrodes 131 and 132.

The average content of the elements may be measured in the same method as the method of measuring the average content of the elements of the metal oxides 141 and 141' disposed between the body 110 and the external electrodes 131 and 132.

The metal oxides 141 and 141' may be formed by immersing some surfaces of the body 110 to which the external electrodes 131 and 132 are to be applied, for example, the third and fourth surfaces 3 and 4 of the body 110 and thermally treating metal oxide paste. Alternatively, the oxides 141 and 141' may be formed by coating metal oxide paste on the entire surface of the body 110 and then thermally treating the coated metal oxide paste.

When metal oxide paste is coated on the body and then thermally treated, the metal oxide 141 may be formed on a surface of the body 110 and may be diffused to permeate into the dielectric layer 111 in the body 110 to form the metal oxide 141' in an inward direction of the body 110 (e.g., the metal oxide may extend into the body from a region in which the body and the external electrodes contact each other). In this case, it is sufficient as long as the metal oxides 141 and 141' may be formed in cracks or pores of the dielectric layer 111 or the external electrodes 131 and 132 exposed on the surface of the body 110, and do not need to be formed to distinguish a boundary between an external surface and an internal surface of the body 110.

After coating the metal oxide paste, paste for an external electrode may be applied to form the external electrodes 131 and 132. In this case, conductive metals, included in the external electrode during a heat treatment of the paste for an external electrode, may be connected to an internal electrode. Accordingly, the metal oxides 141 and 141' may not be disposed in a region in which the internal electrodes 121 and 122 and the external electrode 131 and 132 are connected to each other. This is because due to driving force generated by energy stability between the conductive metals included in the internal electrodes 121 and 122 and the external electrodes 131 and 132, materials of the metal oxides 141 and 141' may not be disposed in the region in which the internal electrodes 121 and 122 and the external electrodes 131 and 132 are connected to each other.

In an exemplary embodiment, an average size of the metal oxide 141 in a direction, perpendicular to one surface of the body 110, may be 4.5 μm or less. The average size in a direction, perpendicular to one surface of the body 110, may refer to a thickness.

When the metal oxide 141' permeates in an inward direction of the body, an average size of the metal oxide 141' in the inward direction of the body 110 may be 4.5 μm or less. The average size in the inward direction of the body 110 may refer to a size in the second direction or a length.

When the average size in the direction perpendicular to one surface of the body 110 and the average size in the inward direction of the body 110 is greater than 4.5 μm, moisture resistance reliability may be improved, but connectivity between the internal electrodes 121 and 122 and the external electrodes 131 and 132 may be reduced or a dielectric capacitance may be reduced.

A lower limit of the average thickness or the average length of the metal oxides 141 and 141' is not set, but the average thickness or average length may be 0.05 µm or more, in detail, 0.1 µm or more, and, in more detail, 0.5 µm or more. Even when the metal oxides 141 and 141' are coated on the body 110 in a small amount, the moisture resistance reliability may be improved. In addition, even when the metal oxides 141 and 141' are partially disposed in a region between the body 110 and the external electrodes 131 and 132, the moisture resistance reliability may be improved.

The thickness or the length of each of the metal oxides 141 and 141' may be measured by scanning the cross-sections in the first and second directions (length and thickness directions) of the body 110, in which the metal oxides 141 and 141' are disposed, with a scanning electron microscope (SEM) with a magnification of 10,000.

As a more detailed example, the thickness may be obtained by measuring a size in a direction, perpendicular to one surface of the body 110 in a scanned image, and by measuring a size in the direction, perpendicular to the one surface of the body 110, at thirty (30) equally spaced points in a vertical direction of the thickness, an average value may be obtained to measure an average size, for example, an average thickness in the direction, perpendicular to the one surface of the body 110.

In addition, the length of the metal oxide 141' may be calculated by measuring a size of the body 110 of a second direction, from a region in which, for example, the dielectric layer 111 and the external electrodes 131 and 132 permeating in an inward direction of the body 110 are in contact with each other to the inward direction of the body 110, and an average value may be calculated by measuring a size of the metal oxide 141' in the second direction at ten (10) equally spaced points in the first direction. In addition, when the average value is measured by extending the measurement of the average value to the dielectric layer 111 on which the metal oxide 141' is disposed, the size of the metal oxide 141' in the inward direction of the body 110 may be more generalized.

A structure, in which the ceramic electronic component 100 has two external electrodes 131 and 132, has been described herein. However, the number and shape of the external electrodes 131 and 132 may vary depending on the shape of the internal electrodes 121 and 122 or other purposes.

The external electrodes 131 and 132 may be disposed on the outside of the body 110 and may be connected to the internal electrodes 121 and 122. As a more detailed example, the external electrodes 131 and 132 may be disposed on the third and fourth surfaces 3 and 4 of the body 110.

The external electrodes 131 and 132 may include first and second external electrodes 131 and 132, respectively connected to the first and second internal electrodes 121 and 122. In more detail, the external electrodes 131 and 132 may include a first external electrode 131, disposed on the third surface 3 of the body 110, and a second external electrode 132 disposed on the fourth surface 4 of the body 110. In this case, the second external electrode 132 may be connected to a potential, different from a potential of the first external electrode 131.

The external electrodes 131 and 132 may be formed of any material as long as they have electrical conductivity, such as a metal, and specific materials may be determined in consideration of electrical characteristics, structural stability, or the like, and further may have a multilayer structure.

For example, the external electrodes 131 and 132 may include electrode layers 131a, 132a, 131b, and 132b, disposed on the metal oxides 141 and 141', and plating layers 131c, 132c, 131d, and 132d disposed on the electrode layers 131a, 132a, 131b, and 132b.

As a more detailed example, the electrode layers 131a, 132a, 131b, and 132b may include first electrode layers 131a and 132a, connected to the internal electrodes 121 and 122 and including a first conductive metal and glass, and second electrodes 131b and 132b disposed on the first electrode layers 131a and 132a and including a second conductive metal and a resin.

In this case, the first and second conductive metals may include at least one selected from the group consisting of copper (Cu), nickel (Ni), silver (Ag), palladium (Pd), and alloys thereof, but exemplary embodiments are not limited thereto. The first and second conductive metals may serve to provide conductivity to the external electrodes 131 and 132. Accordingly, when the multilayer electronic component 100 is mounted on a printed circuit board to be connected to an electrode pad, the first and second conductive metals may serve to receive a voltage therefrom and to transmit the voltage to the internal electrodes 121 and 122. In this case, when the electrode layers 131a, 132a, 131b, and 132b have a multilayer structure, main components of the first and second conductive metals may be different from each other.

The glass may serve to improve bondability and moisture resistance of the external electrodes 131 and 132. For example, adhesion between the electrode layers 131a and 132a of the external electrode and the dielectric layer 111 of the body 110 may be maintained by a glass component, and adhesion between the electrode layers 131a and 132a and the metal oxides 141 and 141' may also be maintained.

The glass may have a composition in which oxides are mixed, and may include at least one selected from the group consisting of, for example, silicon oxide, boron oxide, aluminum oxide, transition metal oxide, alkali metal oxide, and alkaline earth metal oxide.

The external electrodes 131 and 132 may include plating layers 131c, 132c, 131d, and 132d disposed on the electrode layers 131a, 132a, 131b, and 132b.

The plating layers 131c, 132c, 131d, and 132d may serve to improve mounting characteristics. A plating layer may be formed by sputtering or electrolytic plating, and may be formed as a plurality of layers, but exemplary embodiments are not limited thereto. For example, the plating layers 131c, 132c, 131d, and 132d may have a form in which first plating layers 131c and 132c, disposed on the electrode layers 131a, 132a, 131b, and 132b, and second plating layers 131d and 132d, disposed on the first plating layers 131c and 132c, are sequentially formed, and a plating metal included in the first and second plating layers 131c, 132c, 131d, and 132d may include at least one selected from the group consisting of nickel (Ni), tin (Sn), palladium (Pd), platinum (Pt), gold (Au), silver (Au), lead (Pb), and alloys thereof. In this case, when the plating layers 131c, 132c, 131d, and 132d have a multilayer structure, main components of the plating metal included in the first and second plating layers 131c, 132c, 131d, and 132d may be different from each other.

As a more detailed example of the plating layer, the plating layer may be a Ni-plating layer or a Sn-plating layer, and may have a form in which Ni-plating layers and Sn-plating layers are sequentially formed as first plating layers 131c and 132c and second plating layers 131d and 132d, respectively, or a form in which an Sn-plating layer, a Ni-plating layer, and a Pd-plating layer are sequentially formed. Due to inclusion of the plating layer, mountability with a substrate, structural reliability, durability against the external environment, heat resistance, and/or equivalent series resistance (ESR) may be improved.

A size of the multilayer electronic component 100 described herein does not need to be limited. However, to implement miniaturization and high capacitance at the same time, thicknesses of the dielectric layer and the internal electrode should be reduced to increase the number of laminated layers. Thus, in the multilayer electronic component having a size of 0402 (length×width, 0.4 mm×0.2 mm) or less, the reliability improvement effect according to an exemplary embodiment may be further increased.

Hereinafter, although the present disclosure will be described in detail with reference to an embodiment, which has been disclosed for illustrative purposes, it is not limited thereto.

Example

Table 1 illustrates data measured through SEM-EDS of element contents of Comparative Example, in which a metal oxide was not formed, and Example in which a metal oxide was formed.

FIG. 8 illustrates points measured by an SEM-EDS analyzer to measure contents of elements of a multilayer electronic component of Comparative Example in which the metal oxide was not formed. In more detail, FIG. 8A illustrates that a point (spectrum 26) between a body and an external electrode is measured, and FIG. 8B illustrates that a point (spectrum 30) on a body, in which an external electrode is not disposed, is measured.

FIG. 9 illustrates points measured by an SEM-EDS analyzer to measure contents of elements of a multilayer electronic component of Example in which the metal oxide was formed. In more detail, FIG. 9A illustrates that a point (spectrum 33) between a body and an external electrode is measured, and FIG. 9B illustrates that a point (spectrum 57) on a body, in which an external electrode is not disposed, is measured.

FIG. 9 is a view showing a point measured through an SEM-EDS analyzer to measure the element content of the multilayer electronic component of the embodiment in which the metal oxide is formed, and more specifically, FIG. 9A is a metal oxide disposed between the body and the external electrode. A certain point (spectrum 33) is measured, and FIG. 9B is a measurement of a certain point (spectrum 57) of the metal oxide on the body on which an external electrode is not disposed. A content of each element was listed as a value rounded off to three decimal places.

TABLE 1

| | Comparative Example | | Example | |
|---|---|---|---|---|
| wt % | Spectrum 26 | Spectrum 30 | Spectrum 33 | Spectrum 57 |
| Ba | 0.00 | 56.51 | 0.00 | 54.68 |
| Si | 16.65 | 0.00 | 7.39 | 3.98 |
| Al | 0.00 | 0.00 | 6.98 | 2.37 |
| Ca | 0.00 | 0.20 | 10.05 | 1.73 |
| Zn | 0.00 | 0.00 | 12.24 | 5.9 |
| Sr | 23.16 | 0.00 | 0.00 | 0.00 |
| Na | 0.53 | 0.00 | 0.00 | 0.00 |
| O | 59.68 | 25.53 | 63.34 | 20.39 |
| Ti | 0 | 17.76 | 0 | 10.94 |
| Total | 100 | 100 | 100 | 100 |

In spectrum 26 of Comparative Example, Al and Zn were not detected, and accordingly, it can be seen that a metal oxide layer was not formed between a body and an external electrode, and detected Si may be predicted to be detected from glass included in the external electrode. In spectrum 30, another measured point, Zn and Si were not detected, and accordingly, it can be seen that a metal oxide layer was not formed on a body in which an external electrode was not disposed, and detected Ca is predicted to be a subcomponent included in a dielectric layer.

In spectrum 33 of Example, Ca, Zn, and Si were detected, and accordingly, it can be seen that a metal oxide was formed between a body and an external electrode. In spectrum 57, another measured point, Ca, Zn, and Si were detected, and accordingly, it can be seen that a metal oxide was formed even on a body in which an external electrode was not disposed.

Hereinafter, performing a moisture resistance reliability evaluation, for example, a highly accelerated temperature and humidity stress test (HAST) will be described.

After preparing 200 multilayer electronic components in which a metal oxide was not formed, the Comparative Example, and 200 multilayer electronic components in which a metal oxide was formed, the Example, ten multilayer electronic components were mounted in each of twenty (20) channels to prepare a substrate. The substrate reflowed once in the state in which the multilayer electronic components were mounted, and was fed into ESPEC equipment to be exposed to an environment, including a temperature of 120° C. and a relative humidity of 95%, for 200 hours to perform the HAST. In this case, a multilayer electronic component, of which insulating resistance IR was decreased by 1/10 or less as compared with initial insulation resistance $IR_0$, was evaluated to be defective, and the number of deteriorated chips was counted and listed in Table 2. Meanwhile, a multilayer electronic component, of which insulation resistance IR was not decreased by 1/10 or less, was evaluated to be normal.

TABLE 2

| | Evaluation of Moisture Resistance Reliability |
|---|---|
| Comparative Example | 18/20 |
| Example | 3/20 |

FIG. 10A is a HAST evaluation graph of Comparative Example, and FIG. 10B is a HAST evaluation graph of Example. The results in Table 2 are explained with reference to the drawings. In the case of Comparative Example in which a metal oxide was not formed, insulation resistance IR was decreased by 1/10 or less, as compared with initial insulation resistance $IR_0$, in 18 channels, among the 20 channels of the multilayer electronic component, and accordingly, Comparative Example was evaluated to be defective. On the other hand, in the case of Example in which a metal oxide was formed, it can be seen that insulation resistance IR was decreased by 1/10 or less, as compared with initial insulation resistance $IR_0$, in three channels, among the 20 channels of the multilayer electronic component.

From the above results, it can be seen that moisture resistance reliability of the multilayer component, in which the metal oxide was formed, was improved as compared with the multilayer electronic component in which the metal oxide was not formed.

As described above, a metal oxide layer may be formed on a body to prevent permeation of external moisture, resulting in improved moisture resistance reliability of a multilayer electronic component.

While example embodiments have been shown and described above, it will be apparent to those skilled in the art that modifications and variations could be made without departing from the scope of the present invention as defined by the appended claims.

What is claimed is:

1. A multilayer electronic component comprising:
a body including a plurality of dielectric layers and internal electrodes;
external electrodes disposed on the body to be connected to the internal electrodes; and
a metal oxide disposed between the body and the external electrodes,
wherein
the metal oxide includes calcium (Ca), zinc (Zn), silicon (Si), and at least one selected from the group consisting of barium (Ba), boron (B), and aluminum (Al).

2. The multilayer electronic component of claim 1, wherein
an average content of each of calcium (Ca), zinc (Zn), and silicon (Si) included in the metal oxide disposed between the body and the external electrodes is greater than 0 wt % and 13 wt % or less.

3. The multilayer electronic component of claim 1, wherein
the metal oxide extends from a space between the body and the external electrodes to be disposed in a region, in which the external electrode are not disposed, of the body.

4. The multilayer electronic component of claim 3, wherein
an average content of each of calcium (Ca), zinc (Zn), and silicon (Si), included in the metal oxide disposed in the region, in which the external electrodes are not disposed, of the body, is greater than 0 wt % and 6 wt % or less.

5. The multilayer electronic component of claim 1, wherein
the metal oxide is disposed on an entire surface of the body, and is not disposed in a portion in which the internal electrodes and the external electrodes are connected to each other.

6. The multilayer electronic component of claim 1, wherein
an average size of the metal oxide in a direction perpendicular to one surface of the body is 4.5 μm or less.

7. The multilayer electronic component of claim 1, wherein
the metal oxide is disposed in the body, and is disposed in an inward direction of the body from a region in which the body and the external electrodes are in contact with each other.

8. The multilayer electronic component of claim 7, wherein
an average size of the metal oxide disposed in the inward direction of the body is 4.5 μm or less.

9. The multilayer electronic component of claim 1, wherein
the external electrodes include electrode layers including a conductive metal disposed on the metal oxide to be connected to the internal electrodes, and plating layers disposed on the electrode layers.

10. The multilayer electronic component of claim 9, wherein
the electrode layers include first electrode layers connected to the internal electrodes and including glass, and second electrode layers disposed on the first electrode layers and including a resin.

11. The multilayer electronic component of claim 9, wherein
the plating layers include first plating layers disposed on the electrode layers and including a plating metal, and second plating layers disposed on the first plating layers and including a plating metal different from the plating metal of the first plating layers.

12. A multilayer electronic component comprising:
a body including a plurality of dielectric layers and internal electrodes;
external electrodes disposed on the body to be connected to the internal electrodes; and
a metal oxide disposed between the body and the external electrodes,
wherein
the metal oxide is formed by coating metal oxide paste on the body and then thermally treating the coated metal oxide paste, and
the metal oxide paste includes calcium (Ca), zinc (Zn), silicon (Si), and at least one selected from the group consisting of barium (Ba), boron (B), and aluminum (Al).

13. The multilayer electronic component of claim 12, wherein
an average content of the zinc (Zn) included in the metal oxide paste is 3.5 moles or more to 4.5 moles or less with respect to 1 mole of the silicon (Si), and
an average content of the calcium (Ca) included in the metal oxide paste is 1.5 moles or more to 2.0 moles or less with respect to 1 mole of the silicon (Si).

14. The multilayer electronic component of claim 12, wherein
the metal oxide paste is coated on an entire surface of the body.

15. The multilayer electronic component of claim 12, wherein
the metal oxide paste permeates in an inward direction of the body while being thermally treated.

16. The multilayer electronic component of claim 12, wherein the external electrodes include electrode layers including a conductive metal disposed on the metal oxide to be connected to the internal electrodes, and plating layers disposed on the electrode layers.

17. A multilayer electronic component comprising:
a body including a plurality of dielectric layers and internal electrodes;
external electrodes disposed on the body to be connected to the internal electrodes; and
a metal oxide disposed between the body and the external electrodes,
wherein the metal oxide includes zinc (Zn), silicon (Si), and at least one selected from the group consisting of barium (Ba), boron (B), and aluminum (Al).

18. The multilayer electronic component of claim 17, wherein
an average content of zinc (Zn) included in the metal oxide disposed between the body and the external electrodes is greater than 0 wt % and 13 wt % or less.

19. The multilayer electronic component of claim 18, wherein the metal oxide further includes calcium (Ca).

20. The multilayer electronic component of claim 19, wherein
an average content of calcium (Ca) included in the metal oxide disposed between the body and the external electrodes is greater than 0 wt % and 13 wt % or less.

* * * * *